United States Patent [19]

Cantella

[11] Patent Number: 4,632,000
[45] Date of Patent: Dec. 30, 1986

[54] CONTROL DEVICE FOR THE TRANSLATION AND DRIVING OF THE MOVABLE HEAD OF DIECUTTER MACHINES

[75] Inventor: Emiliano Cantella, Vigevano, Italy

[73] Assignee: Atom S.p.A., Italy

[21] Appl. No.: 727,013

[22] Filed: Apr. 25, 1985

[30] Foreign Application Priority Data

May 7, 1984 [IT] Italy ............................ 20828 A/84

[51] Int. Cl.⁴ .......................... B26D 3/00; B26D 7/26
[52] U.S. Cl. ....................................... 83/534; 83/554; 83/563; 83/371; 83/525; 83/55; 318/17
[58] Field of Search ................. 83/534, 525, 530, 563, 83/371, 554, 541, 55; 318/17

[56] References Cited

U.S. PATENT DOCUMENTS

| | | | |
|---|---|---|---|
| 3,884,107 | 5/1975 | Bianchi | 83/534 |
| 4,001,645 | 1/1977 | Haas et al. | 83/534 X |
| 4,210,046 | 7/1980 | Pretty | 83/534 X |
| 4,418,595 | 12/1983 | Cantella | 83/534 X |

Primary Examiner—Donald R. Schran
Attorney, Agent, or Firm—Darby & Darby

[57] ABSTRACT

A control device for the driving and translation, in a chosen direction, of the movable head of a diecutter machine, provides for the pre-setting of the direction of translation and for the successive driving of the pressing head by means of five sets of sensitive plates switches, disposed in the front portion of the machine. By touching opportunely one or two of said plates, combinative logic circuits are activated that allow selection of the direction of motion, the actuation of the thus preset displacement and the lowering of the head for the cutting operation.

3 Claims, 4 Drawing Figures

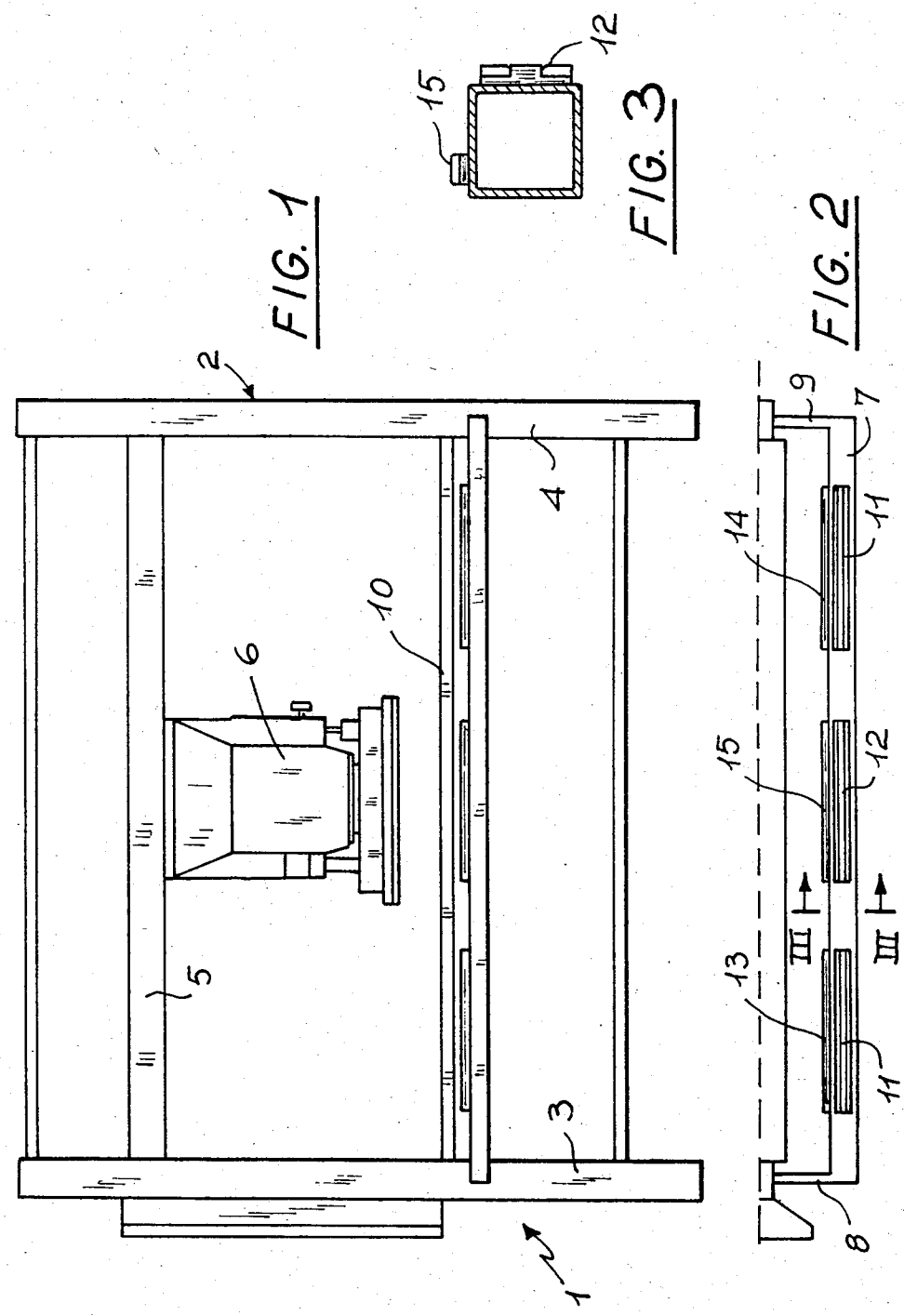

CONTROL DEVICE FOR THE TRANSLATION AND DRIVING OF THE MOVABLE HEAD OF DIECUTTER MACHINES

FIELD OF THE INVENTION

The present invention relates to a control device for the driving and the translation, in a chosen direction, of the movable head of a diecutter machine, particularly of the bridge type, for cutting sheet materials.

BACKGROUND OF THE INVENTION

For actuating the horizontal displacement in the two directions of the head of a diecutter machine, its positioning over the underlying die and its descent for effecting the desired cut, a number of devices are known that execute the sequence of such operations in a more or less automatic fashion. It is known, for example, a diecutter machine, made by the assignee of the present application, that is provided with a device for the automatic retrieval of the die. By means of said device, after a single impulse imparted by the operator, the head startoff in search of the die, detects it, performs the cutting descent, rises and finally returns to the starting position. Such a device, notwithstanding the undoubted technical and functional advantages, is very expensive, because of the high cost associated with all the automatisms with which it is provided, and therefore it is available to a restricted segment of the market.

Another control device of the known type and of a far reduced cost, has a sereis of push-buttons disposed on a couple of handles, associated with the head of the machine, that are gripped all the time by the operator during the entire period of operation, from the horizontal displacement of the head to its descent while the return of the head to its initial position is automatic. It is obvious that the operator, having to drive the machine with his hands on the two handles carried by the head, is compelled to physically follow the horizontal translation movement while keeping his hands in a rather uncomfortable position. All that causes physical weariness to the operator that inevitably reflects negatively on the workmanship as well as on the productivity of the machine.

With the aim to prevent such weariness of the operator, a machine has been made which control device is formed by a horizontal bar, free of being displaced horizontally and of being rotated, assembled between two pins projecting from the lateral columns of the machine. In this case, the operator, gripping with both hands the bar, may command the translation of the head to the right or to the left by simply shifting the bar to the right or to the left respectively.

Soon as the head reaches the desired position, the operator returns the bar to its initial position and successively imparts a rotation to the bar, through that the impulse for the descent of the head for the execution of the cutting operation is imparted.

Once the cutting is performed the head returns to its initial position in correspondence with the side of the frame from where it had started off.

For the sake of more convenient operation, it may be necessary, when the head overtakes the middle of the work plane while proceeding in its cutting excursions, to return it no longer to its initial position, but to a new starting position by the side opposite to the one from where it had started its last excursion. To this effect the operator, when imparting the last impulse with start from the initial position, instead of impressing a single displacement for example, to the right, to the control bar, is obliged to impart, succesively to such first displacement, a second displacement in the opposite direction to invert the horizontal direction of return of the head.

It is evident that this control system, devised to change the starting position of the pressing head, is to the least uncomfortable and scarcely rational for the operator who masters with great difficulty this system of manual control.

Moreover it should be noted that, because of the rotation that the operator must impart to the control bar to obtain the descent of the pressing head, the operator's wrists are subjected to continuous exertion for the entire working day that, besides causing an inevitable weariness, may provoke real physical troubles.

OBJECTS

The main object of the present invention is that of overcoming the above mentioned shortcomings relative to the systems now being used by provision of a control device for executing the translation and the driving down of the movable head of diecutter machines, particularly of the bridge type, which insures a constantly accurate workmanship and requires a sequence of manual controls extremely rational and which do not give rise to physical weariness of the operator.

SUMMARY OF THE INVENTION

This and still further objects that will appear better in the course of the following description are achieved, in accordance with the present invention, by a control device for the translation and driving of the movable pressing head of a diecutter machine of the type comprising an actuating electronic circuit comprising a combinative network of logic gates which inputs are governed by sensitive plate type switches, that, by closing or opening different loops of the circuit, cause the starting off of the desired operation, said movable head being associated with means for its reciprocating displacement both in the horizontal direction and vertical direction, above a fixed check plate over which the material to be cut is disposed, characterized in that said displacement means are governed automatically by said actuating electronic circuit controlled by manual starting means, which actuating electronic circuit has means for establishing a complete operative sequence for the movement of the head, from its positioning, to its lowering, to its rising and finally to its returning to the starting side position, or to the opposite side position, after the cutting, said movements being determined by the activation of relevant logic gates of said electronic circuit.

Advantageously said manual starting means comprise sensitive metallic plates that, touched by the hands of the operator, according to specific combinations, act as switches, thus electrically closing some circuit sections and determining univocal type output configurations each correponding to a single order of movement.

Said sensitive plates are installed on a fixed bar in front of the machine.

BRIEF DESCRIPTION OF THE DRAWINGS

Further features and advantages of the invention will become more apparent from the detailed description of a preferred but not exclusive embodiment of a control device for the translation and driving of the movable head of a diecutter machine hereinafter and with reference to the accompanying drawings presented for illustrative purposes only and therefore not limitative, of which:

FIG. 1 shows an elevation front view of a diecutter machine incorporating the device according to the invention;

FIG. 2 shows a plan view of the front bar of the machine on which the sensitive plates are assembled;

FIG. 3 shows, on an enlarged scale, a cross sectional view along trace III—III of FIG. 2;

DESCRIPTION OF THE PREFERRED EMBODIMENT

Figure 4:
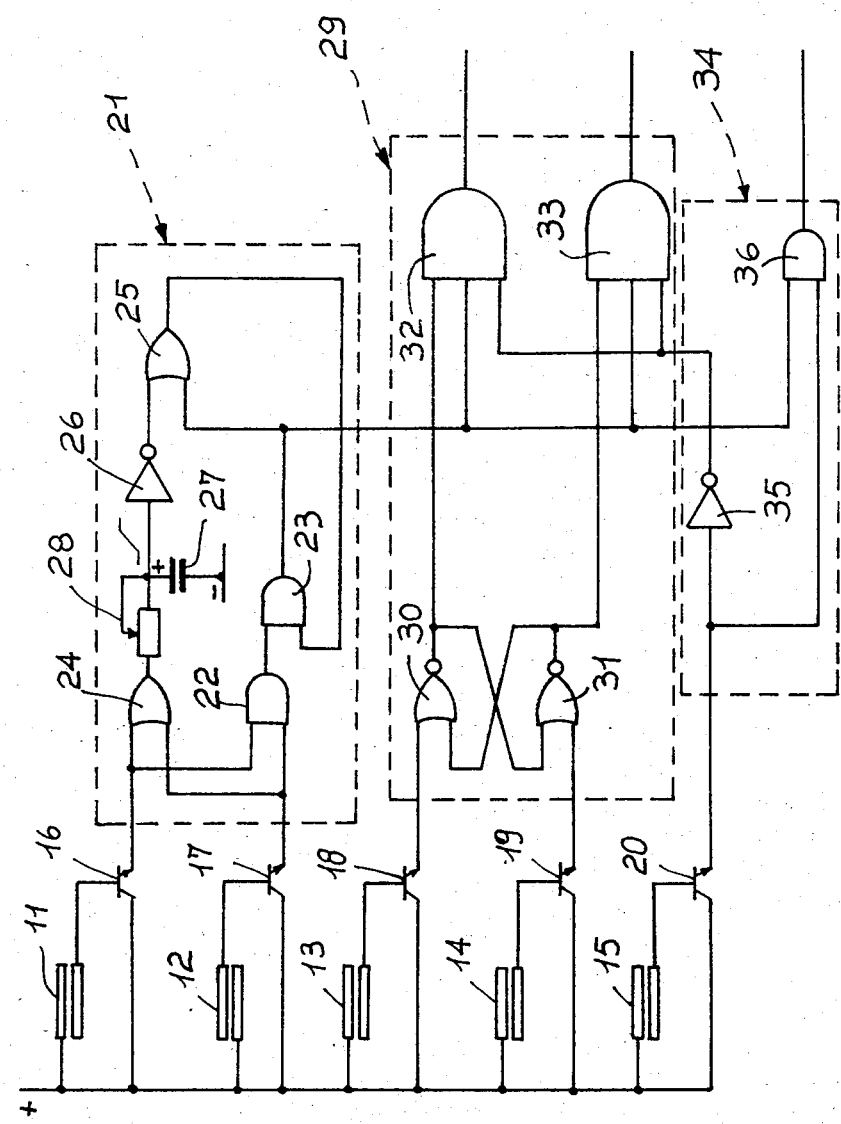
FIG. 4 shows a simplfied electric circuit diagram of the control device of the present invention.

With reference to the figures, and to FIG. 1 in particular, a diecutter machine of the bridge type is aggregately indicated by 1. Among its essential organs, such a machine comprises a fixed frame 2 identified by a couple of side risers 3 and 4 connected at their top by a bridge structure 5 wherein a carriage, not shown in the figure, is runningly engaged and rigidly connected with the movable head 6 of the machine.

In the front portion of the machine 1 a controls carrying bar 7 is supported by a couple of arms 8 and 9 projecting from risers 3 and 4 of the diecutter machine.

As it is possible to observe from FIGS. 2 and 3, a plurality of sets of sensitive plates are disposed on the bar 7 on its top surface and on its side opposite the working plane, shown with 10 in FIG. 1. With reference to FIG. 2, the sets of sensitive plates disposed on the top side of the bar are three, those disposed laterally are indicated with reference numeral 11, and the middle one with reference numeral 12.

With reference to the sets of sensitive plates disposed on the side of bar 7, the sets disposed in correspondence of the lateral sets 11 are indicated with 13 and 14 and the set disposed in correspondence of the middle set 12 with the reference numeral 15.

Said sets of sensitive plates that are advantageously made of metallic material, form part of the electronic circuit associated with the control device of the invention.

Therefore they also appear in the circuit diagram of FIG. 4, wherein the two sets of sensitive plates 11, representing the input of a section of the circuit, are diagrammatically combined in a single unit, while, in reality, they are two distinct units, electrically connected in parallel relationship.

It must be noted that each set of plates 11, as well as set 12 have one plate in common with sets 13 and 14 as well as with set 15. Each set of sensitive plates 13, 14 and 15 is consequently made up by a single metal plate. Similarly to the sets of sensitive plates 11, also sets 12, 13, 14 and 15 represent the inputs of respective circuit sections and thence they are all associated to respective inputs amplification transistors, indicated with reference numerals 16 through 20, as clearly shown in FIG. 4. Still with reference to FIG. 4, the dashed line 21 aggregately indicates a circuit section that represents the enabling system for the execution of the desired operation. The corresponding inputs of the circuit section 21 are the sets of sensitive plates 11 and 12. The circuit section 21 is substantially composed of a plurality of logic gates, opportunely combined and formed by a pair of AND, 22 and 23, by a pair of OR, 24 and 25, as well as by an INVERTER 26 disposed according to the representative diagram of FIG. 4. As it is easily observed, between OR 24 and INVERTER 26 there is a variable capacitance-resistance network made up by a condenser 27 which charge is regulated by trimmer 28.

A second circuit section, which inputs are represented by the sets of sensitive plates 13 and 14, is encompassed by dashed line 29 in FIG. 4. Circuit section 29 has the function of presetting the direction of the horizontal displacement of the head 6 of the diecutter 1. As it may be observed, this section comprises a plurality of logic gates such as, for example, a pair of NOR 30 and 31 as well as a pair of AND 32 and 33 sequentially combined according to the diagram of FIG. 4. A last circuit section which input is formed by sensitive plate 15, is finally indicated with dashed line 34. Section 34 is preset for enabling the cutting operation of the head 6 and is composed by a pair of logic gates, made, respectively, by an INVERTER 35 and by an AND 36 opportunely connected according to the diagram of FIG. 4.

In accordance with the present invention, circuit section 21 acts synchronally with circuit section 29 or, respectivly, with circuit section 34. In other words, if the enabling signal from circuit section 21 does not come, circuit sections 29 and 34 cannot be activated, therefore the head 6 of the diecutter may neither translate nor perform the cutting operation.

After having described this much in a prevalently structural sense, the operation of the device according to the present invention may be described as follows.

When the diecutter 1 is switched on, the outputs of NOR 30 and 31 assume a random configuration. For presetting the translation of the head toward the left a hand is placed over sensitive plates 13. The weak current that flows through the hand must necessarily be amplified by transistor 18 that conducts and places, by a sequence of combinative effects, the inputs and outputs of said NOR 30 and 31 in such a way as to have stable output conditions.

The output signal thus formed, brought to the input of AND 33, enables it for the translation toward the left.

Similarly for presetting the translation toward the right a hand is placed over sensitive plates 14. The weak current that flows through the hand is amplified by transistor 19 that conducts and produces the above noted combinations in an inverted form, bringing to the input of AND 32 the new signal which enables it for the translation to the right.

In practice, in said circuits, the sequence of inputs and outputs that determine a certain circuit solution are memorized.

Henceforth, resting both hands on sensitive plates 11 and 12 simultaneously, a weak current will flow therethrough which will be amplified by transistors 16 and 17 and will determine an input configuration of AND 22 and 23 and of OR 24 and 25 such that, in combination with that of AND 32 and 33 previously set, determines in output a translation of the head either to the right or to the left.

In order to perform the cutting it will be sufficient to touch the sensitive plates 15, whereby the weak current amplfied by transistor 20 determines the input configuration of INVERTER 35 and of AND 36 such that it stops the preceeding translation and enables the cutting phase, which is thence executed by resting both hands simultaneously on sensitive plates 11 and 12.

Trimmer 28 is used to adjust the time of charge of condenser 27 in reaching the threshold value of IN- VERTER 26 thus closing the electrovalve for the lowering of the head 6. The descent is thence interrupted by the tripping of the end of stroke microswitch that drives also the return of the head.

The input and output signal configurations are determined by the high and low logic levels of the various gates of the combinative network forming the electronic circuit of the control device of the invention. The sensitive plates, once touched, precisely drive the formation of such logic levels. It must be specified that only by touching simultaneously plates 11 and 12 a previously memorized configuration of translation or of cutting may be actuated.

As it may be noted the control device in accordance with the invention truly insures a correct diecutting operation without wearing the operator, because continuous wearing movements are spared to him. In fact it should be noted that a bridge type diecutter may have a width of the work plate in the order of two meters. In this respect, while in the case of the operator driving the head with his hands on the control handles of the prior art he had to follow the translative movements of the head 6, in the present case the operator remains standing in a well defined position between plates 13 and 15 or between plates 14 and 15 when it is necessary to invert the direction of the return of the head 6.

Also in respect of the other known technique providing for the control bar to be displaced and rotated, the present invention is extremely advantageous and more rational, in so far the operator does not need to exert his wrists in continuous torsional movements, rather he achieves the desired driving impulses by simply resting his palms and his fingers on the sensitive plates described above.

Obviously, the invention is not limited to the one embodiment described above and a number of modifications are possible all within the spirit and scope of the invention.

What is claimed is:

1. A control device for controlling the translation and driving of a movable head of a die-cutting machine, which comprises:
    a plurality of hand sensitive plate switches, the switches being operable in first and second operator selectable states, the die-cutting machine being responsive to the selected state of the switches wherein the state of the switches determine the translation and driving of the movable head; and
    electronic circuit means for determining the execution of a desired operation by the movable head, the circuit means including a network of digital gates, the network being responsive to the state of the plate switches to effect movement of the movable head and operation of the die-cutting machine, the hand sensitive plate switches including a first switch for causing lateral translation of the movable head in one direction, and a second switch for causing lateral translation of the movable head in another direction opposite said one direction, the electronic circuit means being adapted to return the movable head to one of a starting position and a non-starting position upon completion of the die-cutting operation.

2. A control device for controlling the translation and driving of a movable head of a die-cutting machine, which comprises:
    a plurality of hand sensitive plate switches, the switches being operable in first and second operator selectable states, the die-cutting machine being responsive to the selected state of the switches wherein the state of the switches determines the translation and driving of the movable head; and
    electronic circuit means for determining the execution of a desired operation by the movable head, the circuit means including a network of digital gates, the network being responsive to the states of the plate switches to effect movement of the movable head and operation of the die-cutting machine, the electronic circuit means being adapted to return the movable head to one of a starting position and a non-starting position upon completion of the die-cutting operation;
    the die-cutting machine including a horizontal bar disposed in front of the machine and connected thereto, the bar having a top surface and a front surface, the hand sensitive plate switches being disposed on the top surface and front surface of the bar and being positioned to be in lateral alignment with each other so that one of said switches disposed on the top surface is aligned with another of said switches disposed on the front surface, whereby said one of said switches and said another of said switches may be actuated by movement of an operator's fingers and palm, respectively, of one hand of the operator.

3. The control device as defined by claim 2, wherein the control device includes first, second, third, fourth and fifth groups of the hand sensitive plate switches, the first, second, third and fourth group of switches being provided for controlling the lateral translation of the movable head, the fifth group of switches being provided for controlling the cutting operation of the die-cutting machine.

* * * * *